(12) United States Patent
Agapiou et al.

(10) Patent No.: US 9,902,892 B2
(45) Date of Patent: Feb. 27, 2018

(54) EXPANSIVE CEMENT

(71) Applicant: HALLIBURTON ENERGY SERVICES, INC., Houston, TX (US)

(72) Inventors: Kyriacos Agapiou, Houston, TX (US); Cody Glenn Harris, Tomball, TX (US); Jeffery Dwane Karcher, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/319,309

(22) PCT Filed: Sep. 30, 2014

(86) PCT No.: PCT/US2014/058270
§ 371 (c)(1),
(2) Date: Dec. 15, 2016

(87) PCT Pub. No.: WO2016/053290
PCT Pub. Date: Apr. 7, 2016

(65) Prior Publication Data
US 2017/0145288 A1    May 25, 2017

(51) Int. Cl.
| | | |
|---|---|---|
| *C04B 28/04* | (2006.01) |
| *E21B 33/14* | (2006.01) |
| *C09K 8/467* | (2006.01) |
| *C04B 22/00* | (2006.01) |
| *C04B 40/00* | (2006.01) |

(52) U.S. Cl.
CPC ............ *C09K 8/467* (2013.01); *C04B 22/008* (2013.01); *C04B 22/0093* (2013.01); *C04B 28/04* (2013.01); *C04B 40/0039* (2013.01); *E21B 33/14* (2013.01)

(58) Field of Classification Search
CPC . C04B 40/0039; C04B 28/04; C04B 22/0093; C04B 22/008; C09K 8/467; E21B 33/14
See application file for complete search history.

(56) References Cited

U.S. PATENT DOCUMENTS

| | | |
|---|---|---|
| 3,861,929 A | 1/1975 | Deets et al. |
| 6,447,597 B1 | 9/2002 | Repette et al. |
| 6,835,243 B2 | 12/2004 | Brothers et al. |
| 2006/0118006 A1 | 6/2006 | Amathieu et al. |

FOREIGN PATENT DOCUMENTS

| | | | |
|---|---|---|---|
| CN | 103466986 A | | 12/2013 |
| JP | 7-315907 A | * | 12/1995 |
| JP | 2007-238369 A | * | 9/2007 |

OTHER PUBLICATIONS

International Search Report and Written Opinion of the International Searching Authority dated May 29, 2015, filed in related application PCT/US2014/058270.

* cited by examiner

*Primary Examiner* — Anthony J Green
(74) *Attorney, Agent, or Firm* — McAfee & Taft

(57) ABSTRACT

An expansive cement composition including a Portland cement having a calcium aluminate cement additive and a lithium compound additive is provided. The lithium compound additive is capable of producing expansion in set cements when the temperature is at or below room temperature and minimizes the amount of calcium aluminate cement additive needed.

11 Claims, 4 Drawing Sheets

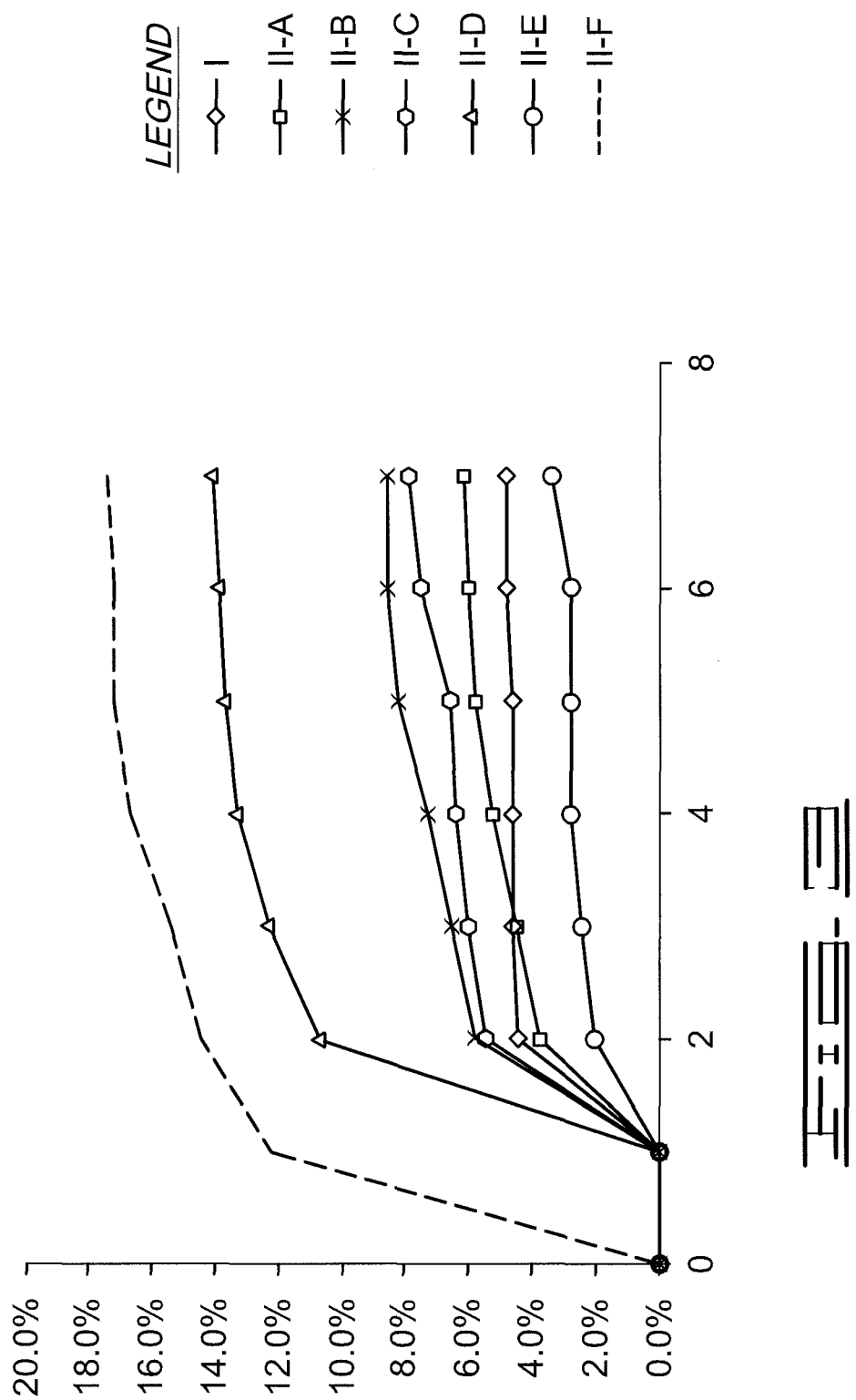

EXPANSIVE CEMENT

FIELD

This disclosure relates to cement compositions and more particularly to expansive cement compositions, which expand slightly after setting. Such compositions are useful for cementing a casing in place in a bore of an oil, gas or other well and in well abandonment operations.

BACKGROUND

Cement systems, such as Portland cement, typically are subject to shrinkage during and after setting and hardening. In some applications such shrinkage is problematic. For example, in downhole applications for cementing a casing in a well and for abandonment plugs in wells, it is crucial that good bonding occurs between the set cement and the casing and/or between the set cement and the formation borehole wall in order to achieve effective zonal isolation. Poor cement/formation bonding, poor cement/casing bonding, expansion and contraction of the casing resulting from internal pressure or thermal stress, and inadequate mud removal all contribute to the formation of small gaps or "microannuli" at the cement/casing or cement/formation interface. These microannuli allow communication between the zones through which the wellbore extends.

Cement systems that expand slightly after setting are a proven means of preventing and/or sealing microannuli and improving primary cementing results. The improved bonding is the result of mechanical resistance or tightening of the cement against the casing and formation. In unrestrained environments, such as cement use in buildings and roads, expansion of the cement during setting and hardening can result in cracking and failure. In the restrained downhole environment, the cement expands to eliminate void spaces and reduce internal cement porosity.

Current additive compositions that are introduced into Portland cements to provide expansive cement typically rely on elevated temperatures to achieve a sufficient expansion effect, often above 100° F. (37.8° C.). There is a need, however, for expansive Portland cement systems that achieve sufficient expansion at temperatures below 100° F. (37.8° C.) and more typically at temperatures below room temperature (about 73° F. or about 23° C.).

BRIEF DESCRIPTION OF THE DRAWINGS

FIG. 3 is a graph of expansion versus days for each cement composition sample in the Examples.

DETAILED DESCRIPTION

Figure 1:
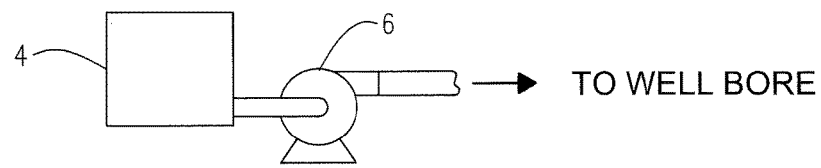
FIG. 1 illustrates a system for preparation and delivery of a cement composition to a wellbore in accordance with aspects of the present disclosure.

It has now been discovered that relatively small amounts of a lithium compound added to a Portland cement along with some calcium aluminate cement and calcium sulfate provide for cements having suitable expansion even at relatively low temperatures, generally below about 100° F. (37.8° C.) and more typically below about room temperature (73° F. or 23° C.) and even at temperatures below 60° F. (15.6° C.) or temperatures of about 55° F. (12.8° C.) or below.

A typical expansive cement system or composition according to an embodiment comprises a Portland cement and an expansion additive. While most Portland cements can be used, typically the Portland cement is selected from the group consisting of API Class A Portland cement, API Class C Portland cement, API Class G Portland cement, API Class H Portland cement and any combination thereof. Additionally, the cement system can include fluid loss additives, set accelerators, cure rate adjusters, and similar.

The expansion additive composition comprises calcium aluminate cement, a lithium compound and calcium sulfate (typically added as ground gypsum). The calcium sulfate can be added to the cement system separately from the other components of the expansion additive composition. The expansion additive composition can also comprise calcium hydroxide and sodium bicarbonate.

An exemplary expansion additive composition comprises calcium aluminate present from about 5% to about 50%; a lithium compound present from about 0.01% to about 5.00%, calcium sulfate present in an amount from about 50% to about 80% by weight of the composition; calcium hydroxide present in an amount from about 1% to about 20% by weight of the composition; and sodium bicarbonate present in an amount from about 0.1% to about 5% by weight of the composition, all based on weight of the expansion additive composition.

Generally, the calcium aluminate cement can be present in an amount of at least about 5%, at least about 10% or at least 15% up to about 50%, about 40% or 35% by weight of the additive composition. The lithium compound can be present in an amount of at least about 0.01%, at least about 0.05% or at least 0.10% up to about 5.00%, about 1.00%, 0.50% or 0.30% by weight of the additive composition. The calcium sulfate can be present in an amount of at least about 40%, at least about 50%, or at least 60% up to about 90%, about 80% or 75% by weight of the additive composition. The calcium hydroxide can be present in an amount from at least about 1%, at least about 5% or at least 7% up to about 20%, about 15% or 12% by weight of the additive composition. The sodium bicarbonate can be present in an amount from at least about 0.1%, at least about 0.5% or at least 1.0% up to about 5%, about 3% or 2% by weight of the additive composition.

While not wishing to be bound by theory, the volume expansion of the resulting ettringite product from the calcium aluminate and calcium sulfate provides expansion action, and it is believed that the lithium compound co-additive enhances the performance of the expansion additive composition through interaction with the calcium aluminate cement. The addition of a lithium compound to the other components of the expansion additive composition improves the reactivity of the system such that the rate of expansion is more rapid and the desirable action of the expansive cement composition can be utilized effectively at lower temperatures than that of conventional expansion additives. The lithium compound can result in an expansion of at least 10% in the set cement within 1 day, of at least 15% in the set cement within 3 days and at least 17% within 7 days. Exemplary lithium compounds are lithium salts. Most lithium salts can be used in the expansion additive composition. Suitable lithium salts include lithium carbonate, lithium halides, lithium sulfate, hydrates of lithium sulfate, lithium nitrate, and lithium hydroxide.

The above described expansion additive composition can be mixed with Portland cement to produce an expansive cement composition. Typically, the expansion additive composition will be added in an amount from about 1% to about 20% based on the weight of the Portland cement. More typically, the expansion additive composition will be added in an amount from 5% to 15% based on the weight of the Portland cement. Prior to use downhole, water is added to the resulting mixture to create a slurry. The water will typically be added in an amount from about 30% to about 60%, and more typically, from 40% to 55% by weight of the Portland cement.

Generally, the resulting expansive cement composition can comprise from about 0.5% to about 8.0% calcium aluminate cement by weight of the Portland cement. However, the expansive cement composition can comprise at least about 1.0%, or at least 1.5% up to about 5.0% or 3.5% calcium aluminate cement by weight of the Portland cement.

The expansive cement composition can comprise from about 0.001% to about 0.500% lithium compound by weight of the Portland cement. However, the expansive cement composition can comprise at least about 0.005%, or at least 0.010% up to about 0.150, about 0.100% or 0.050% lithium compound by weight of the Portland cement.

The expansive cement composition can comprise from about 1% to about 15% calcium sulfate by weight of the Portland cement. However, the expansive cement composition can comprise at least about 5% up to about 10% calcium sulfate by weight of the Portland cement. Further, the calcium hydroxide can be present in an amount from about 0.1% to about 3.0% or from 0.5% to 2.0% by weight of the Portland cement and the sodium bicarbonate can be present in amount from about 0.01% to about 1.00% or from 0.05% to 0.5% by weight of the Portland cement.

In some embodiments, the expansive cement composition comprises a set accelerator, such as calcium chloride. If calcium chloride is used, it can be present in an amount of at least about 0.1% or about 0.5% up to about 5.0% or up to 2% by weight of the Portland cement. Additionally, the set accelerator can be mixed with the expansion additive composition prior to the additive composition being introduced to the Portland cement.

The expansive cement composition can be used in a method wherein the Portland cement, expansion additive composition and water are mixed to form a slurry. The resulting cement slurry composition is then introduced into the bore to form a plug or to cement casing in the borehole. In cementing casing in the borehole, the cement slurry composition is placed between the casing and the borehole wall. The borehole can be below about 100° F. (37.8° C.), below 73° F. (23° C.), below 60° F. (15.6° C.) or at about 55° F. (12.8° C.) or below at the site to be cemented.

The exemplary compositions disclosed herein may directly or indirectly affect one or more components or pieces of equipment associated with the preparation, delivery, recapture, recycling, reuse, and/or disposal of the disclosed compositions. For example, the disclosed compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary compositions. The disclosed compositions may also directly or indirectly affect any transport or delivery equipment used to convey the compositions to a well site or downhole such as, for example, any transport vessels, conduits, pipelines, trucks, tubulars, and/or pipes used to compositionally move the exemplary compositions from one location to another, any pumps, compressors, or motors (e.g., topside or downhole) used to drive the exemplary compositions into motion, any valves or related joints used to regulate the pressure or flow rate of the exemplary compositions, and any sensors (i.e., pressure and temperature), gauges, and/or combinations thereof, and the like. The disclosed compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of a cement composition in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2A:
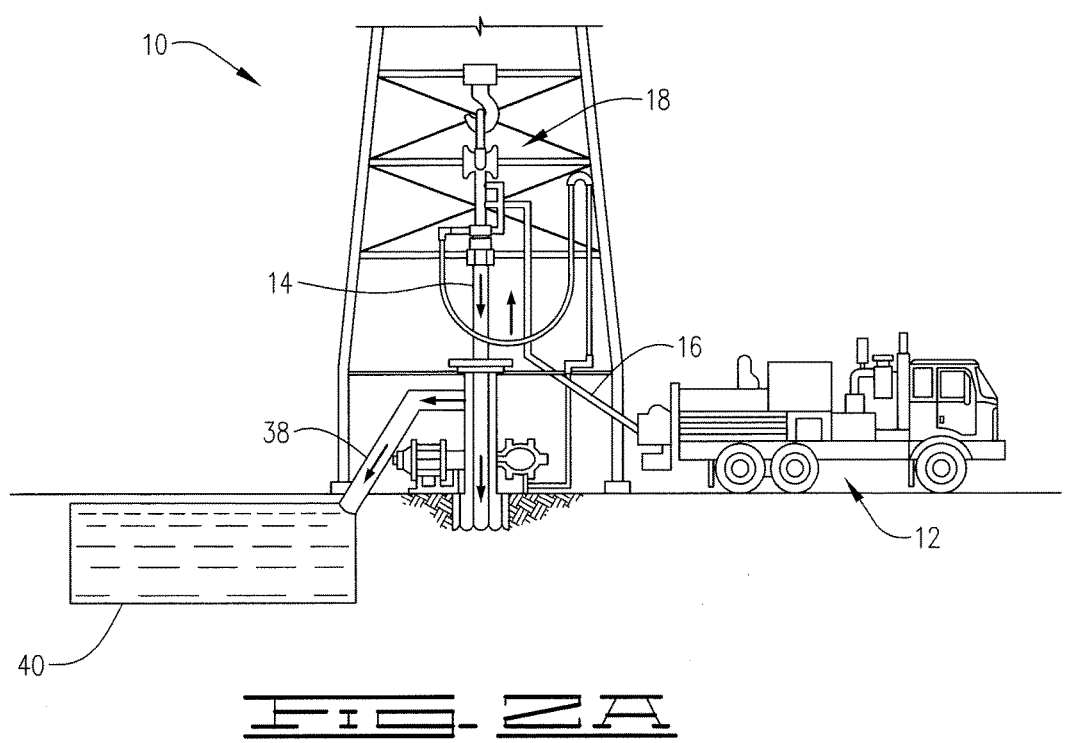
FIG. 2A illustrates surface equipment that may be used in placement of a cement composition in a wellbore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
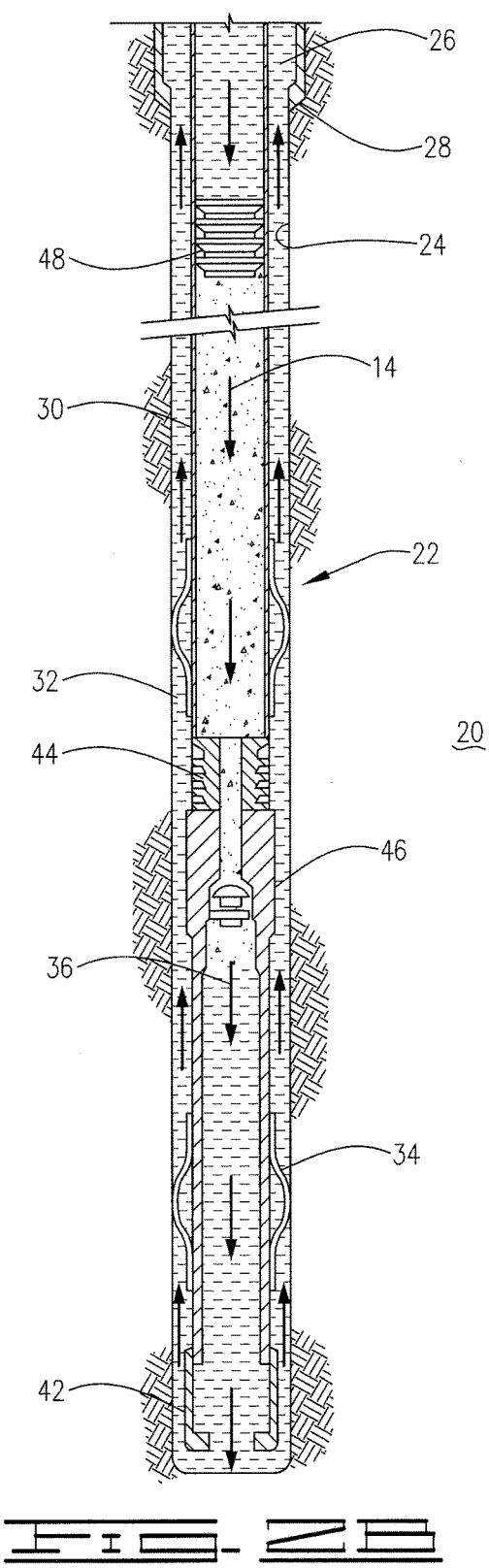
FIG. 2B illustrates placement of a cement composition into a wellbore annulus in accordance with aspects of the present disclosure.
Figure 4:
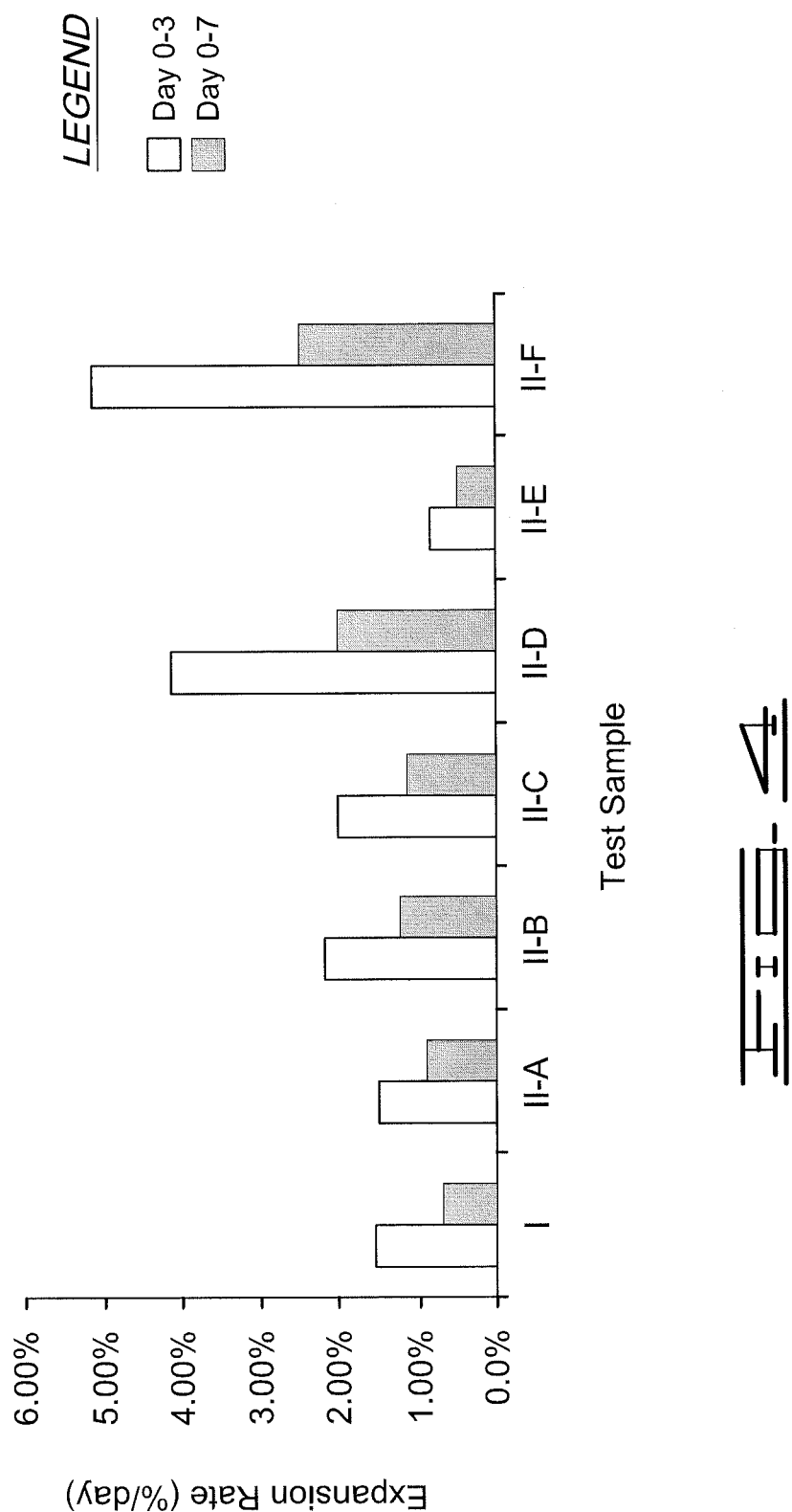
FIG. 4 is a chart of the expansion rate for each cement composition sample in the Examples.

Turning now to FIG. 2B, the cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiments, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

EXAMPLES

The present invention is exemplified by the following examples. The examples are not intended and should not be taken to limit, modify or define the scope of the present invention in any manner.

Six cement additive composition samples were prepared. The six samples were designated as Samples A-F and the composition of each is shown in Table 1, wherein the percentages are by weight of the total cement additive composition. In the samples, two different formulations of calcium aluminate cement (CAC) were used. The CAC's were calcium aluminate cement made by Kerneos Inc. and marketed under the trade name Secar 71 and Secar 51. Secar 51 contains more of the monocalcium aluminate clinker phase.

TABLE 1

| Component | Sample A | Sample B | Sample C | Sample D | Sample E | Sample F |
|---|---|---|---|---|---|---|
| Calcium Sulfate | 71.4% | 62.7% | 60.2% | 54.0% | 71.4% | 71.3% |
| Secar 71 CAC | 17.4% | 26.1% | 28.9% | 34.8% | — | 17.4% |
| Secar 51 CAC | — | — | — | — | 17.4% | — |
| Calcium Hydroxide | 10.0% | 10.0% | 9.6% | 10.0% | 10.0% | 10.0% |
| Sodium Bicarbonate | 1.2% | 1.2% | 1.2% | 1.2% | 1.2% | 1.2% |
| Lithium Carbonate | | | | | | 0.2% |
| Total | 100.0% | 100.0% | 100.0% | 100.0% | 100.0% | 100.0% |

Seven cement slurry samples were then prepared comprising Class H Portland cement. The first cement sample designated as Sample I had no expansion additive. The other six cement samples each contained one of cement additive Samples A-F and were designated as cement Sample II.A, Sample II.B, Sample II.C, Sample II.D, Sample II.E and Sample II.F, respectively. All the samples included calcium chloride as a set accelerator. Also, all the samples included a fluid loss additive marketed under the trade name Halad 322 by Halliburton Energy Services, Inc. The formulations of the cement samples are shown in Table II, wherein the percentages are by weight of the Portland cement.

TABLE 2

| Component | Sample I | Sample II.A through II.F |
|---|---|---|
| Class H Portland Cement | 100.0% | 100.0% |
| Expansion Additive | — | 10.0% |
| Fluid Loss Additive | 0.6% | 0.6% |
| Set Accelerator | 1.0% | 1.0% |
| Deionized H$_2$O | 49.4% | 49.4% |

Sample I was tested to gauge the performance of Portland cement without any expansion additive. Expansion additives A-F were mixed into Portland cement sample II at 10% by weight of Portland cement, as indicated in Table 1. Samples I and Samples IIA-II.F were prepared under standard API conditions, then poured into expansion molds to be cured over a 7 day period at 55° F. (12.8° C.) in a recirculating water bath. The expansion measurements for each sample were taken daily with a micrometer. The results from the expansion tests are displayed in FIG. 1.

All test samples that contained expansion additives showed greater overall expansion than Portland cement alone, except Sample II.E. These results indicate that increasing the amount of CAC provides greater overall expansion when cured at 55° F. (12.8° C.). Sample II.D contained twice the CAC as Sample II.A, and expanded nearly 130% more over the 7 day period. Samples II.B and Sample II.C, which contained one and half times the amount of CAC in Sample II.A, showed only moderate improvements in expansion.

Each of Samples II.A-II.E did not set in 24 hours, and thus, an expansion reading could not be recorded at the end of day 1. These samples were observed to have set within 48 hours, however, and measurements were taken from that point onward.

Sample II.F had the same formulation as Sample II.A but lithium carbonate was added as a component to the expansion additive. Lithium carbonate was added at 0.2% by weight of expansion additive composition. When cured in the water bath at 55° F. (12.8° C.), Sample II.F set suitably and expanded a great deal within 24 hours. This represented a significant improvement over the previously tested samples. The overall expansion of Sample II.F was nearly 200% greater than expansion for Sample II.A under the test conditions. Furthermore, the expansion rate in the early states of curing (i.e. within 3 days) and through the entire test period are greater for Sample II.F than any other sample tested. FIG. 2 charts the expansion rate for each test sample through the initial period (day 0-3) and over the entire test period (day 0-7).

As can be seen, the expansion additive containing the lithium ion compound gives rapid expansion, even at low temperatures, and provides much improved overall expansion. The lithium compound additive is capable of producing expansion in set cements when the temperature is at or below room temperature and minimizes the amount of calcium aluminate cement additive needed as illustrated by a comparison of Samples II.D and II.F. Sample II.D has the closest performance to that of Sample II.F but utilizes twice the amount of CAC and does not achieve as good a result in setting time and expansion.

In accordance with the above disclosure, in one embodiment there is provided an expansion additive composition for use in Portland cement. The additive comprises a calcium aluminate cement and lithium compound. The calcium aluminate cement is present in an amount from about 5% to about 50% by weight of the composition, and the lithium compound in an amount from about 0.01% to about 5.00% by weight of the composition. More preferably, the calcium aluminate cement is in an amount from about 10% to about 40% by weight of the composition, and the lithium compound is in an amount from about 0.05% to about 1.00% by weight of the composition. Alternatively, the calcium aluminate cement is in an amount from 15% to 35% by weight of the composition, and the lithium compound is in an amount from 0.10% to 0.50% by weight of the composition.

The lithium compound can be a lithium salt. The lithium salt can be selected from the group consisting of lithium carbonate, lithium halides, lithium sulfate, hydrates of lithium sulfate, lithium nitrate, lithium hydroxide, and mixtures thereof. Additionally, the composition can further comprise calcium sulfate present in an amount from about 50% to about 80% by weight of the composition. Also, the composition can comprise calcium hydroxide present in an amount from about 1% to about 20% by weight of the composition; and sodium bicarbonate present in an amount from about 0.1% to about 5.0% by weight of the composition.

In another aspect, the expansion additive composition for use in Portland cement consists essentially of: a calcium aluminate cement in an amount from about 5% to about 50% by weight of the composition; a lithium compound in an amount from 0.01% to 5.00% by weight of the Portland cement; and one or more compounds selected from the group consisting of calcium sulfate, calcium hydroxide, sodium bicarbonate, a set accelerator, and a fluid loss additive.

In another embodiment, there is provided an expansive cement composition comprising a Portland cement, calcium aluminate cement, lithium compound and calcium sulfate. The calcium aluminate cement can be present in an amount from about 0.5% to about 8.0% by weight of the Portland cement. The lithium compound can be present in an amount from about 0.001% to about 0.500% by weight of said Portland cement. Preferably, the calcium aluminate cement can be present in an amount from about 1.0% to about 5.0% by weight of the Portland cement and the lithium compound can be present in an amount from about 0.005% to about 0.150% by weight of the Portland cement. Alternatively, the calcium aluminate cement can be present in an amount from 1.5% to 3.5% by weight of the Portland cement, and the lithium compound can be in an amount from 0.010% to 0.100% by weight of the Portland cement. The cement composition can comprise calcium sulfate present in an amount from about 1% to about 15% by weight of the Portland cement.

The cement composition can have, during and after setting, at least a 10% increase in volume compared to the preset composition when setting occurs at a temperature of below 100° F. (37.8° C.), at a temperature below about 73° F. (23° C.), below 60° F. (15.6° C.) or at about 55° F. (12.8° C.) or below. Additionally, the increase in volume after setting can be at least 15% when setting occurs at a temperature of below 100° F. (37.8° C.), at a temperature below about 73° F. (23° C.), below 60° F. (15.6° C.) or at about 55° F. (12.8° C.) or below. Also, the increase in volume after setting can be at least 17% when setting occurs at a temperature of below 100° F. (37.8° C.), at a temperature below about 73° F. (23° C.), below 60° F. (15.6° C.) or at about 55° F. (12.8° C.) or below.

Also, the cement composition can comprise calcium hydroxide present in an amount from about 0.1% to about 3.0% by weight of said Portland cement, and sodium bicarbonate present in an amount from about 0.01% to about 1.00% by weight of the Portland cement. In some embodiments the cement composition comprises calcium chloride in an amount from about 0.1% to about 5.0%, or from 0.5% to 2% by weight of the Portland cement.

In another aspect the expansive cement composition consists essentially of: a Portland cement; a fluid loss additive; a calcium aluminate cement in an amount from about 0.5% to about 8.0% by weight of the Portland cement; a lithium compound in an amount from about 0.001% to about 0.500% by weight of the Portland cement; calcium sulfate; water; and one or more compound selected from the group consisting of calcium hydroxide, sodium bicarbonate, a set accelerator and a fluid loss additive.

In a further embodiment, there is provided a method for cementing a casing in a bore of a well having a borehole wall, comprising placing a cement slurry of one of the above described expansive cement compositions between the casing and the borehole wall; wherein the borehole wall and the casing are at a temperature below about 100° F. (37.8° C.). Additionally, the borehole wall and the casing can be at a temperature below about 73° F. (23° C.). In some embodiments, the borehole wall and the casing can be below 60° F. (15.6° C.) or they can be at about 55° F. (12.8° C.) or below.

Therefore, the present invention is well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. An expansive cement composition comprising:
a Portland cement,
a calcium aluminate cement in an amount from about 0.5% to about 8.0% by weight of said Portland cement;
a lithium compound in an amount from about 0.001% to about 0.50% by weight of said Portland cement;
calcium sulfate present in an amount from about 1% to about 15% by weight of said Portland cement;
calcium hydroxide present in an amount from about 0.1% to about 3.0% by weight of said Portland cement; and
sodium bicarbonate present in an amount from about 0.01% to about 1.00% by weight of said Portland cement.

2. The composition of claim 1, wherein said composition, during and after setting, results in at least a 10% increase in volume when setting occurs at a temperature of below 100° F.

3. The composition of claim 2, wherein the lithium compound is a lithium salt selected from the group consisting of lithium carbonate, lithium halides, lithium sulfate, hydrates of lithium sulfate, lithium nitrate, lithium hydroxide, and mixtures thereof.

4. The composition of claim 3, wherein said calcium aluminate cement is in an amount from about 1.0% to about 5.0% by weight of said Portland cement and said lithium compound is in an amount from about 0.005% to about 0.150% by weight of said Portland cement.

5. The composition of claim 4, wherein said calcium aluminate cement is in an amount from 1.5% to 3.5% by weight of said Portland cement and said lithium compound is in an amount from 0.010% to 0.100% by weight of said Portland cement.

6. The composition of claim 5, wherein said composition, after setting, results in at least a 17% increase in volume when setting occurs at a temperature of below 60° F.

7. A method for cementing a casing in a bore of a well having a borehole wall, comprising:
placing a cement slurry composition between the casing and the borehole wall, which composition comprises a Portland cement;
a calcium aluminate cement in an amount from about 0.5% to about 8.0% by weight of said Portland cement; and
a lithium compound in an amount from about 0.001% to about 0.500% by weight of said Portland cement, calcium sulfate present in an amount from about 1% to about 15% by weight of said Portland cement, calcium hydroxide present in an amount from about 0.1% to about 3.0% by weight of said Portland cement, and sodium bicarbonate present in an amount from about 0.01% to about 1.00% by weight of said Portland cement;
wherein said borehole wall and said casing are at a temperature below about 100° F.

8. The method of claim 7, wherein said calcium aluminate cement is in an amount from about 1.0% to about 5.0% by weight of said Portland Cement, and wherein said lithium compound is in an amount from about 0.005% to about 0.150% by weight of said Portland cement.

9. The method of claim 8, wherein said borehole wall and said casing are at a temperature below about 73° F. (23° C.).

10. The method of claim 9 further comprising mixing the components of the cement composition using mixing equipment.

11. The method of claim 9 wherein the cement composition is introduced into the wellbore using one or more pumps.

* * * * *